United States Patent [19]
Svensson et al.

[11] Patent Number: 5,926,091
[45] Date of Patent: Jul. 20, 1999

[54] ALARM SYSTEM FOR COMPUTER EQUIPMENT CONNECTED IN A NETWORK

[75] Inventors: Lars Svensson; Mats Karling, both of Linköping, Sweden

[73] Assignee: TP Control AB, Stockholm, Sweden

[21] Appl. No.: 08/913,416

[22] PCT Filed: Mar. 15, 1996

[86] PCT No.: PCT/SE96/00330

§ 371 Date: Nov. 18, 1997

§ 102(e) Date: Nov. 18, 1997

[87] PCT Pub. No.: WO96/29638

PCT Pub. Date: Sep. 26, 1996

[30]   Foreign Application Priority Data

Mar. 17, 1995 [SE] Sweden .................................. 9500952
Oct. 3, 1995 [SE] Sweden .................................. 9503414

[51] Int. Cl.⁶ .................................................. G08B 13/14
[52] U.S. Cl. ........................ 340/568.2; 340/505; 340/571; 340/825.07; 340/825.54
[58] Field of Search ................................ 340/568.2, 571, 340/545.6, 505, 825.54, 825.07, 531; 395/187.01

[56]   References Cited

U.S. PATENT DOCUMENTS

| | | | |
|---|---|---|---|
| 4,654,640 | 3/1987 | Carll et al. ............................... | 340/568 |
| 5,034,723 | 7/1991 | Maman ..................................... | 340/568 |
| 5,231,375 | 7/1993 | Sanders et al. .......................... | 340/568 |
| 5,260,664 | 11/1993 | Graham ..................................... | 324/522 |
| 5,379,023 | 1/1995 | Dalton ...................................... | 340/568 |
| 5,406,260 | 4/1995 | Cummings et al. ..................... | 340/568 |
| 5,668,952 | 9/1997 | Slane ............................... | 340/825.54 X |
| 5,675,321 | 10/1997 | McBride ................................... | 340/568 |
| 5,715,174 | 2/1998 | Cotichini et al. ................... | 340/568 X |
| 5,726,627 | 3/1998 | Kane et al. .............................. | 340/531 |

FOREIGN PATENT DOCUMENTS 2 593 950  8/1987  France .
2 173 618  10/1986  United Kingdom .

*Primary Examiner*—Thomas Mullen
*Attorney, Agent, or Firm*—Young & Thompson

[57]   ABSTRACT

The present invention concerns an alarm device for computer units (13a, 13b) which, via a network of twisted pair type, are connected to a common hub (3). The computer units (13a 13b) are arranged to be connected to a first alarm unit (4) corresponding to the respective computer unit. This incorporates an input (25) for connection to the hub, an output (23) for operational connection to a network board in a computer unit corresponding to the alarm unit, and a connection (22) for interconnection with a second alarm unit (5; 7) or a connection unit (10). In the device according to the invention, an alarm center (1) is operationally connected to the hub, which is arranged to transmit a request generated in the alarm center to the first alarm unit (4) and to notify the alarm center when a change occurs in the computer units (13a, 13b) associated with the alarm centers.

8 Claims, 5 Drawing Sheets

ALARM SYSTEM FOR COMPUTER EQUIPMENT CONNECTED IN A NETWORK

BACKGROUND OF THE INVENTION

1. Field of the Invention

The present invention concerns an alarm device for computer units, which are connected in a network of twisted pair type, in which two or more conductors in the existing network are used for communication between the different computer units, where the computer units are connected via the network to a common hub so that a connection is obtained between each of the computer units via the hub.

2. Description of the Related Art

The increasing application of computers is today creating large computer networks in administrations, schools, and companies. The computers and their associated equipment must often be arranged at a number of separate locations which cannot always be kept under supervision. Since both the computers and their equipment are highly attractive to thieves, this has implied extensive theft activity concerning both computers with screens as well as components inside the computers, such as e.g. hard disks diskette drives, and memory boards.

To reduce the theft risk for computers, it has become increasingly common to provide them with some type of alarm. For example, previously known through WO-91/19277 is a fibreoptic alarm system for protection of computers. The alarm system is based on the principle that each part of the equipment is connected to an alarm center via an optical sensor and optical fibres. The document shows an alarm device per se which can be used for computer equipment but which is based on the principle that each part of the protected equipment is connected to an optical network specific to the alarm device. For this reason, this alarm device is becoming both expensive and impractical in large computer networks.

Previously known through U.S. Pat. No. 5,260,664 is an alarm device for monitoring of networks with a specific loading, such as e.g. networks of twisted pair type. The device can be used in an Ethernet network, which connects a number of units to a common hub. Changes in the network loading are detected via the alarm device according to the invention. The alarm device makes it possible to detect whether the network is intact or whether the loading in the network has decreased, which would indicate a failure somewhere in the network. This alarm is per se reliable and not especially expensive to accomplish, through a deficiency of the alarm is that information cannot be obtained about the cause of the failure in the network or where this failure has occurred. In modern extensive computer networks, it is often important to have each unit alarmed and to arrange for information about the origin of the alarm to be obtained at the alarm centre.

U.S. Pat. No. 5,231,375 is based on the principle that network-connected computer units which regularly transmit or receive signal current are connected to an alarm unit via the network. The alarm unit continuously measures the signal current which flows between two or more computer units and generates an alarm signal when this computer unit is interrupted for any time longer than that associated with normal signal failures. A deficiency is that, if the power supply to any computer unit is interrupted, the computer unit cannot transmit or receive signal current, which implies the alarm unit giving a false alarm.

Previously known through U.S. Pat. No. 4,654,640 is an alarm system used in combination with a PBX telephone system, which incorporates lines connected to protected equipments. Removal of a line is detected by a local safety monitoring device, which reports the situation to a central safety monitoring device via the PBX system. The alarm device is thus not integrated in a computer network, the invention being entirely based on access to a digital PBX telephone network.

SUMMARY OF THE INVENTION

The purpose of the present invention is to solve the deficiencies and drawbacks found in previously known alarms in networks with computer units which are interconnected via a hub, where the network is of twisted pair type, in which two or more conductors in the existing network are used for communication between the different computer units. This is achieved through an alarm center being operationally connected to the hub; that one or more computer units in the network are arranged to be connected to a first alarm unit corresponding to the respective computer unit, which incorporates an input for connection to the hub, an output for operational connection with a network board in the computer units, and a connection for interconnection with a second alarm unit or connection unit, whereby a closed line is formed to the alarm unit; and that the hub is arranged, via at least two of the conductors not used for communication between the computer units, to transmit a request generated in the alarm center to each of the first alarm units, which are arranged to detect associated computer units and to notify the alarm center when a change occurs in the associated computer.

According to a further characteristic of the invention, the first alarm unit incorporates an address unit, and the alarm center is arranged to evaluate the address for the address unit in the respective alarm unit, whereby information concerning the origin of an alarm can be obtained.

According to another special characteristic of the invention, the first alarm unit incorporates a microswitch, which is arranged in an alarm loop so that the latter is interrupted when the alarm unit is removed from the associated computer unit.

According to another characteristic of the invention, the first alarm unit incorporates a switch coupling connected to the address unit of the alarm loop, the switch coupling being arranged to affect the connection between the address unit and alarm center when the alarm unit is opened or removed.

According to a further characteristic of the invention, the first alarm unit is arranged inside an openable case which contains the computer unit corresponding to the alarm unit; and that the first alarm unit arranged in the computer unit is included in an alarm circuit, which is arranged to be affected on unauthorised opening of the case, whereby the alarm unit is arranged to notify the alarm center.

The invention is further characterised in that the first alarm unit is integrally arranged with the network board.

According to another special characteristic of the invention, the first alarm unit is arranged in a build-on board to the network board.

According to further special characteristic of the invention, the first alarm unit is arranged in a board cable-connected to the network board.

BRIEF DESCRIPTION OF THE DRAWINGS

The invention will be described in more detail below with reference to the attached drawings, which show an advantageous embodiment of the invention.

DESCRIPTION OF THE PREFERRED EMBODIMENTS

Figure 1:
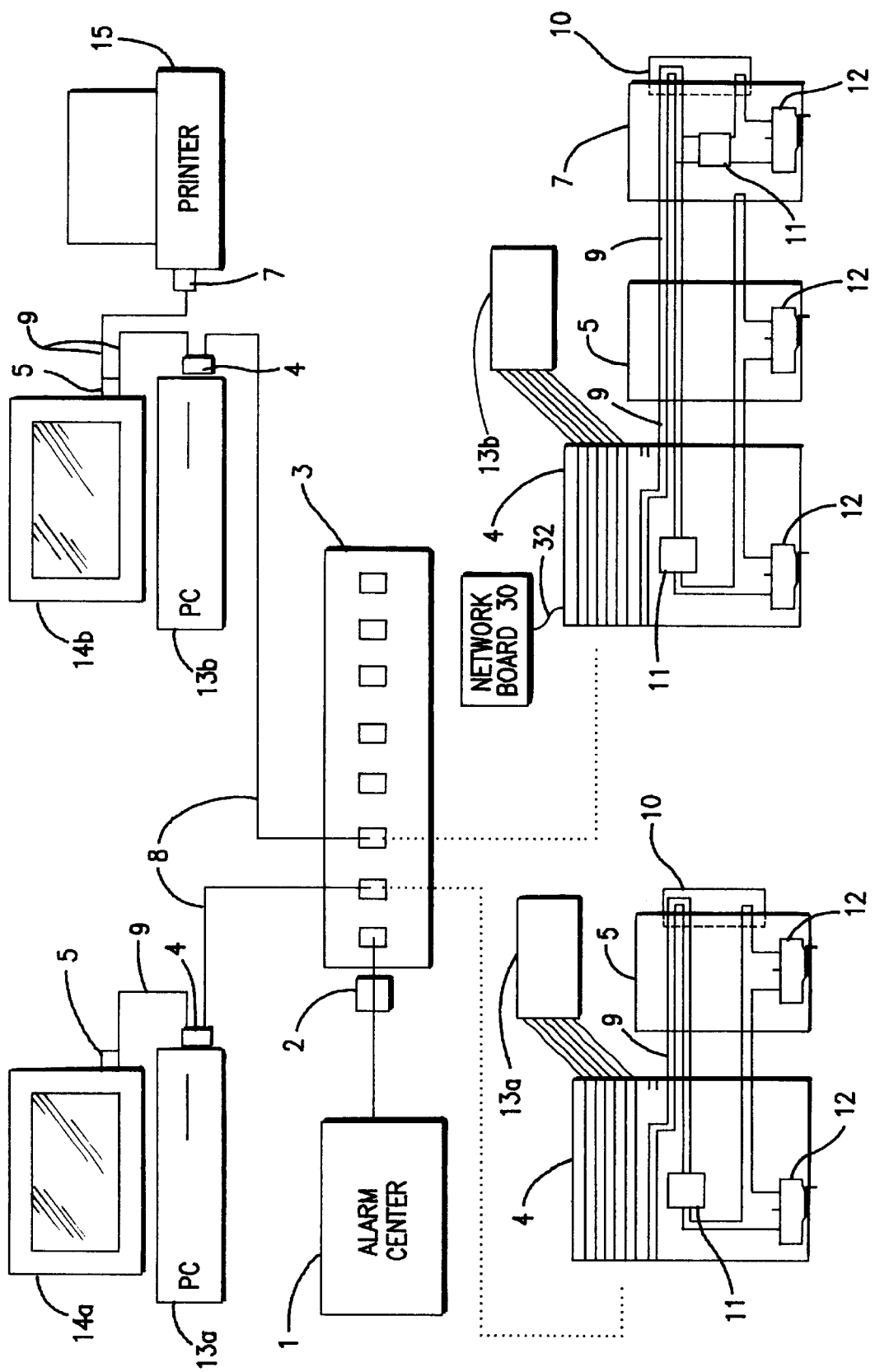
FIG. 1 shows a basic coupling for the alarm system in a computer network with a personal computer (PC), monitor, and personal computer, monitor and printer.

FIG. 1 shows an alarmed computer network according to the invention together with a basic coupling of the latter. The network shown in the drawing incorporates five different computer units; two personal computers 13a, 13b, two monitors 14a, 14b, and one printer 15, which are connected to hub 3. Alarm center 1 is connected to a vacant output on the hub via connection adapter 2. The other outputs on the hub are intended for the computer units arranged in the network. Each computer unit is provided with one alarm unit to alarm center 1 via the common hub.

Figure 2:
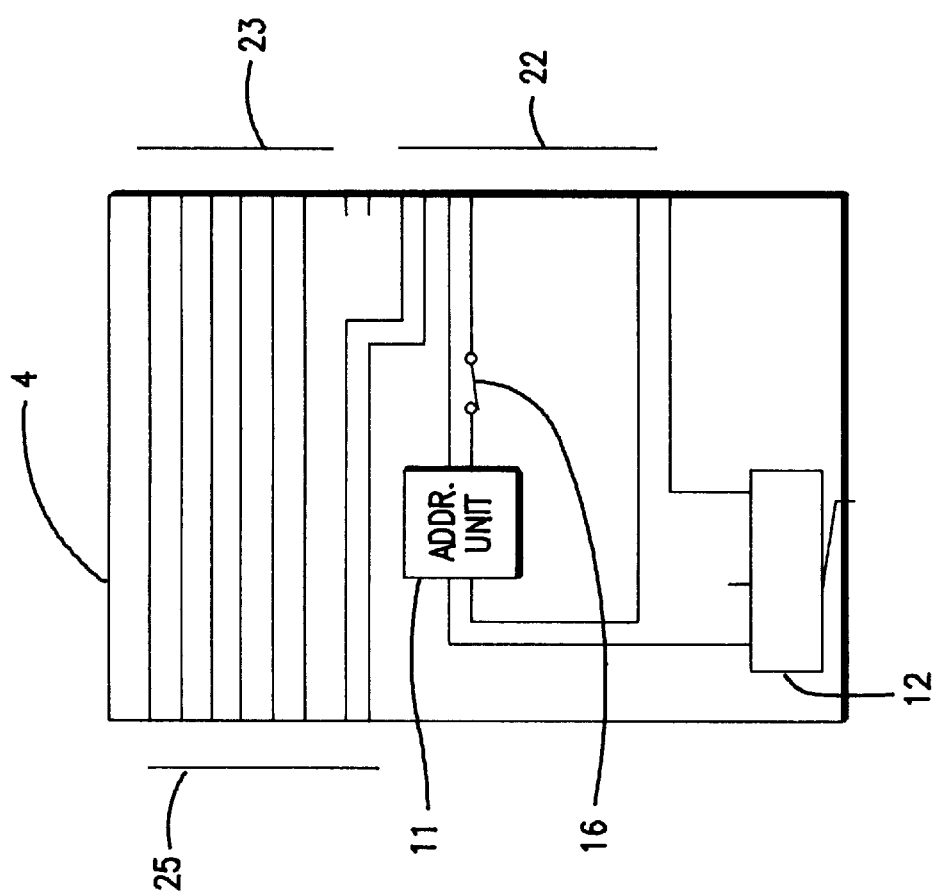
FIG. 2 shows a first alarm unit according to the invention.

A first alarm unit 4 of the type shown in FIG. 2 is connected to personal computers 13a, 13b. First alarm unit 4 shown in the drawing incorporates a first connection 25, a second connection 23, a third connection 22, an address unit 11, a switch coupling 16, and a microswitch 12. First connection 25 comprises an input to alarm unit 4 and, in the embodiment shown, consists of a connection for a databus consisting of eight conductors, such as e.g. and 8-modular jack. Second connection 23 comprises an output from first alarm unit 4, whereby six of the above-noted eight conductors are connected to one network board in respective computer unit 13a, 13b.

The remaining two conductors 9 are connected to third connection 22 on first alarm unit 4 and are arranged to facilitate interconnection with further alarm units 5, 7 or connection unit 10. In this embodiment, the third connection comprises one connection for six conductors in the same way as for second connection 23. In a functioning alarm device, these six conductors are operationally connected to each other in such a manner that the alarm center is included in a closed line.

A specific alarm address to the alarmed unit is provided through circuit address unit 11. This address unit is connected to two conductors in such a way that the latter form part of the line through first alarm unit 4 and any further alarm units 5, 7. Switch coupling 16 on the input to address unit 11 is arranged so that the connection between address unit 11 and alarm center 1 is interrupted when the alarm unit is opened or removed. Circuit microswitch 12 is arranged in an alarm loop arranged for the latter. Microswitch 12 is connected to the computer in such a manner that the latter is arranged in a detachable part of the computer case, whereby unauthorissed opening of the computer is detected. If the computer is opened, the microswitch is affected so that the alarm loop through the latter is interrupted. The alarm center can thereby obtain information about this failure and whether the computer unit may have been exposed to any other type of effect. This embodiment of the alarm center, however, leaves open the possibility of opening the computer without the alarm being activated using a bypass of address unit 11. This bypass is of course desirable to enable authorised measures to be taken in the computer, whereas they cannot be executed without permission from the alarm center.

Figure 4:
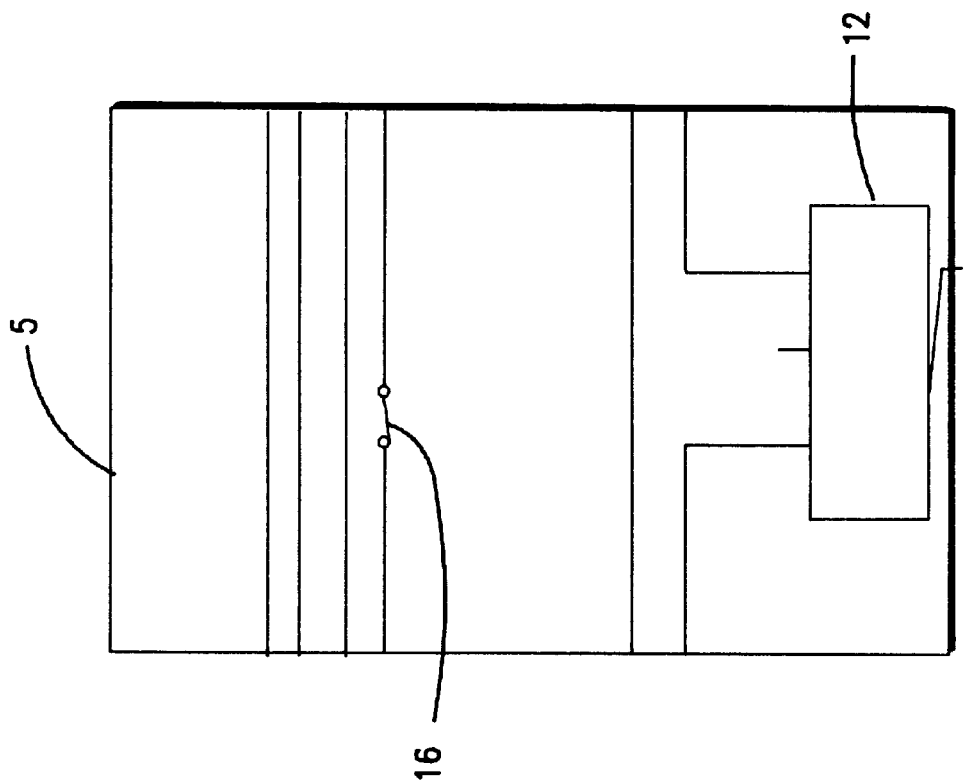
FIG. 4 shows a second embodiment of another alarm unit according to the invention.

To alarm e.g. a monitor directly connected to a specific personal computer, a second alarm unit 5 of the type shown in FIG. 4 can be used. This alarm unit is not addressable, but incorporates only two different cable connections and one microswitch 12. As distinct from first alarm unit 4 shown in FIG. 2, this unit is not intended for direct connection to the hub via the computer network, but instead envisages connection to an addressable first alarm unit 4 or an addressable second alarm unit 7, which are connected to a second computer unit.

Figure 3:
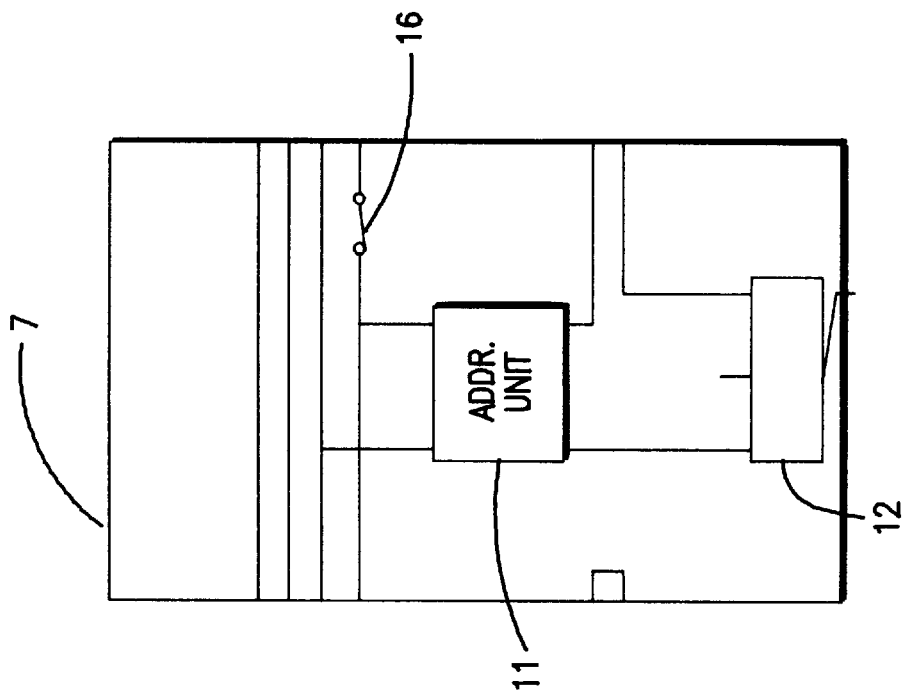
FIG. 3 shows an embodiment of another alarm unit.

A further addressable second alarm unit 7 is shown in FIG. 3. As distinct from monitors 14a, 14b, printer unit 15 is provided with addressable second alarm unit 7. This is due to the fact that the printer may be arranged so that it is separated from the other equipment, e.g. in a separate printer room. The monitor, however, is most often directly connected to a respective personal computer. The second alarm unit 7 used is shown in FIG. 3 and substantially agrees with that shown in FIG. 4 except that second alarm unit 7 intended for the printer is provided with addressable alarm circuit 11. This alarm unit is also arranged in connection to computer unit not directly connected to the network.

Figure 5:
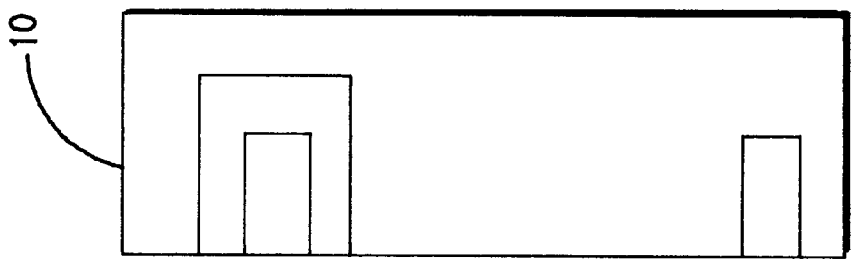
FIG. 5 shows a connection device for the alarm unit.

To facilitate coupling of an unlimited number of alarm units in one line, each alarm unit is arranged so that two conductors couple through the request transmitted from the alarm center to any further alarm units. To enable a closed line to be formed to the different alarm units, connection unit 10 is used, which loops the conductors in the alarm units. The connection unit is also used for connection of the alarm loop through one or more alarm units in which microswitches are arranged. This connection unit is shown in FIG. 5.

As shown in FIG. 1, each of the units included in the computer network is thus provided with its own alarm unit, which is arranged in conjunction with the unit'as connection to the computer network.

The alarm center is arranged so that an alarm is activated from the alarm unit when one of cables 8 connecting the respective personal computer to the computer network hub is removed. If the computer is disconnected from the network, the alarm databus line is interrupted, and the alarm centre cannot any longer maintain contact with the different address units arranged in the alarm units. Through each alarm unit being linked with a specific address unit, the alarm center can identify which part(s) of the computer equipment has been disconnected from the alarm device and consequently disconnected from the network.

The alarm center is correspondingly arranged so that an alarm is activated if cable 9 between the personal computer and monitor is disconnected or if the connection the printer is affected. Different address units 11 mean that the alarm center can detect a disconnected address unit.

Should there be any unauthorised opening of opening-protected equipment, the alarm center will give an alarm signal through corresponding microswitch 12 is the opening-protected equipment transferring from closed to interrupted position and the alarm loop thereby being interrupted, which affects the status message for this alarm unit to the alarm center. The alarm signal is also received even when the whole alarm unit is removed from the computer unit to which it is fixed.

The alarm center used in the device according to the invention regularly transmits a request to each of the alarm units connected to the hub which has a specific address. These alarm units report their respective address values and statuses to the alarm center. So long as the switch coupling is not affected in the respective alarm unit, the alarm center detects the address values from each of the alarm units connected to the different computer units. The alarm center is also arranged to establish the status of a specific alarm unit. If the microswitch interrupts the alarm loop, the status is affected, whereby the alarm center may e.g. find that the alarm loop has been interrupted at specific address unit 11.

Figure 6:
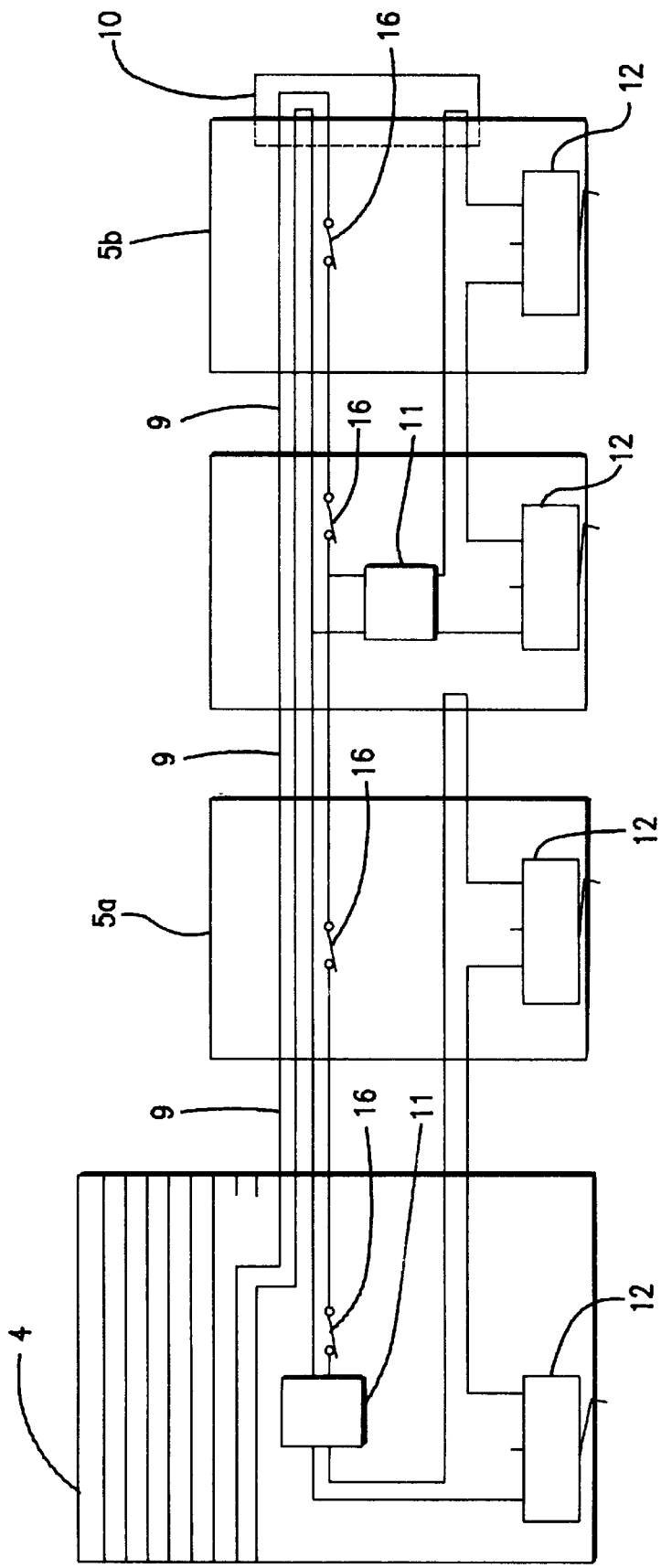
FIG. 6 shows a possible interconnection of the units shown in FIGS. 2, 3, 4, and 5.

FIG. 6 shows how a number of alarm units can be connected so that the alarm device according to the invention can effectively cover a number of computer units. The interconnection shown in the drawing is suitable e.g. for a situation where personal computer 13a is connected to monitor 14a and two printers 15 arranged in another room. First alarm unit 4 is in this situation connected to personal computer 13a and engaged between the latter and hub 3. The other alarm units 5, 7 are connected to first alarm unit 4 via cables 9 specifically arranged for this purpose so that a closed line is formed to each alarm unit. Alarm unit 5a next following first alarm unit 4 is intended for monitor 14a and comprises a second non-addressable alarm unit 5a, since the monitor is directly connected to personal computer 13a. Since the printers are arranged at a separate location in relation to the personal computer and monitor, one of the alarm units connected to the latter comprises second addressable alarm unit 5b. The line to the alarm units and alarm loop is closed by one alarm unit, which is directly connected to last alarm unit 5b.

Each of the computer units directly connected to the network, such as e.g. personal computers 13a 13b in FIG. 1, are thus connected to an addressable first alarm unit 4, which is coupled between the hub and corresponding computer unit and which couples through unaffected the computer signals from the hub to the computer unit and vice versa. Other lower-level computer units, such as e.g. monitor and printer, which are connected to a computer unit connected to the network, are provided with either addressable second alarm unit 7 or non-addressable second alarm unit 5 depending on the physical placement of this unit. The alarm unit which is located far from the network in connection terms and hub is provided with above-noted connection unit 10, which interconnects the conductors and this alarm unit so that a closed line is formed to each alarm unit and so that an alarm loop is formed through the latter.

Figure 7:
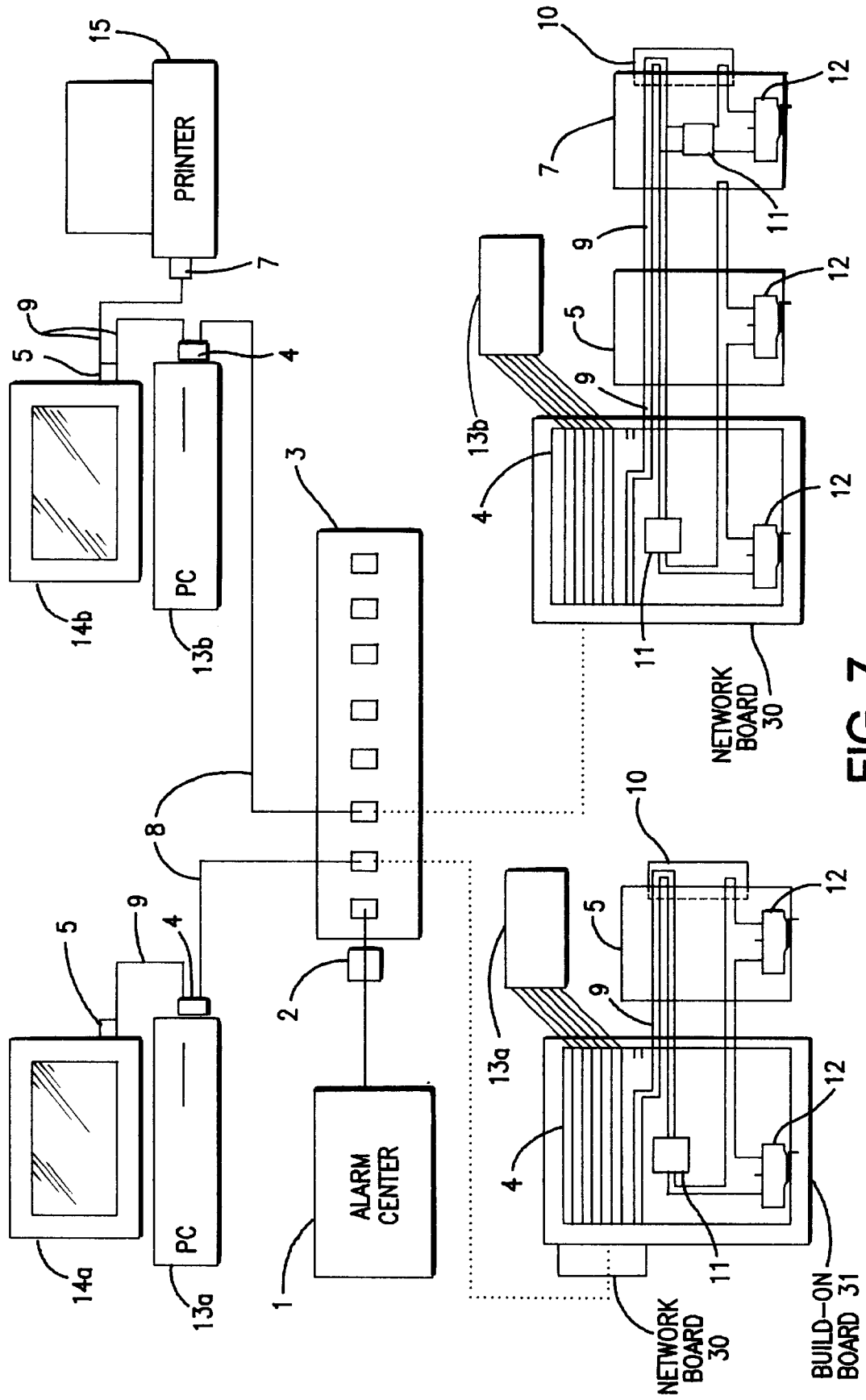
FIG. 7 shows an embodiment of the alarm system in a computer network with a personal computer (PC), monitor, and personal computer, monitor and printer.

FIG. 7 shows an embodiment of the alarm system where first alarm unit 4 is arranged inside the openable case which encloses the computer unit. In a preferred embodiment, the alarm center is integrally arranged with the network board 30 of the computer unit. The network board 30 arranged for the alarm function then diverts two conductors for an alarm function, whereas the other conductors in the connected databus are used for network communication of the computer unit. The two alarm conductors are coupled in the previously indicated manner in an alarm circuit, which is connected to microswitch 12 at a suitable part of the openable case of the computer unit. As indicated above, the alarm circuit also incorporates an address unit 11, whereby alarm unit 4 can be given a unique address. This address unit 11 is integrated in the network board 30. To allow connection to further alarm units 5, 7 or to a so-called connection unit 10, the computer unit is equipped with an extra output, which is only used to achieve the alarm function in the network.

In a second embodiment of the device according to the invention, first alarm unit 4 is arranged in a build-on board 31 to the network board 30. Much as for a network board with an integrated alarm unit, installation of alarm unit 4 is extremely simple. In this embodiment, however, the network board 30 is required to be arranged for this type of build-on board 31. Much as for a network board with an integrated alarm unit, the computer unit must also here be provided with a special output for the alarm function.

A first alarm unit 4 can also be installed in a computer units whose network board has not been adapted for an alarm function. A special alarm unit 4 is then coupled, e.g., via cable 32, between the network connection of the computer unit and its network board 30, as illustrated in FIG. 1. Placement of alarm unit 4 inside the computer unit case is optional. Two of the conductors in the new databus which are not used for network communication are connected to an alarm circuit, with the other conductors being allowed to pass through unaffected to the network board 30. The alarm circuit incorporates a microswitch 12, which rests on the openable case of the computer unit in such a manner that microswitch 12 transfers from closed to interrupted position if the case or part thereof is removed. The computer unit is provided with an extra alarm output, whereby further alarm units 5, 7 can be connected in series to first alarm unit 4. No further alarm units 5, 7 are then used in connection unit 10 connected to the noted output. The alarm circuit is closed by this connection unit 10.

The alarm device according to the invention is especially suitable for application in networks of twisted pair type in Ethernet type networks, in which a pair of conductors connected to each computer unit in the network is not used for communication with the hub. The invention, however, should not be regarded as being limited to this advantageous application, but is also applicable to each type of computer network in which one or more computer units are connected to a common hub and in which at least two conductors are unused in each connection.

We claim:

1. Alarm device for computer units (13a, 13b), which are connected in a twisted pair network, in which two or more conductors in the existing network are used for communication between different computer units, where the computer units are connected via the network to a common hub (3) so that a connection is obtained between each of the computer units via the hub (3), characterised in that an alarm center (1) is operationally connected to the hub (3), at least two of the connectors not used for communication between the computer units (13a,13b), are connected to an address unit (11) in a first alarm unit (4), associated with one or more of the computer units, the alarm center (1) is arranged to generate a request to the address unit (11) in the first alarm unit (4), the address unit (11) in the first alarm unit (4) is arranged to report its address and status to the alarm center (1) upon said request, and the alarm center (1) is arranged to activate an alarm when it cannot maintain contact with the address unit (11) in the first alarm unit (4).

2. Device according to claim 1, characterised in that the first alarm unit (4) incorporates a connection (22) for interconnection with a second alarm unit (5;7) or connection unit (10), whereby a closed loop is formed to the alarm unit.

3. Device according to claim 1, characterised in that the first alarm unit incorporates a microswitch (12), which is arranged in an alarm loop so that the latter is interrupted when the alarm unit (4) is removed from the associated computer unit (13a, 13b); and the first alarm unit (4) incorporates a switch coupling (16) connected to the address unit (11) of the alarm loop, the switch coupling (16) being arranged to affect the connection between the address unit (11) and alarm center (1) when the alarm unit is opened or removed.

4. Device according to claim 2, characterised in that the first alarm unit incorporates a microswitch (12), which is arranged in the alarm loop so that the latter is interrupted when the alarm unit (4) is removed from the associated computer unit (13a13b); and the first alarm unit (4) incorporates a switch coupling (16) connected to the address unit (11) of the alarm loop, the switch coupling (16) being arranged to affect the connection between the address unit (11) and alarm centre (1) when the alarm unit is opened or removed.

5. Device according to claim 1, characterised in that
the first alarm unit (4) is arranged inside an openable case, which contains the computer unit (13a,13b) corresponding to the alarm unit (4); and
the first alarm unit (4) arranged in the computer unit (13a,13b) is included in an alarm circuit, which is arranged to be affected on unauthorised opening of the case, wherein the alarm unit (4) is arranged to notify the alarm center (1) upon the unauthorized opening of the case.

6. Device according to claim 5, characterised in that the first alarm unit (4) is integrally arranged with a network board.

7. Device according to claim 5, characterised in that the first alarm unit (4) is arranged in a build-on board to a network board.

8. Device according to claim 5, characterised in that the first alarm unit (4) is arranged in a board cable-connected to a network board.

\* \* \* \* \*